June 24, 1969    W. P. SCHMITT ET AL    3,452,148
ELECTRICAL CABINET WITH SEPARABLE PARTS
Filed July 27, 1967    Sheet 2 of 5
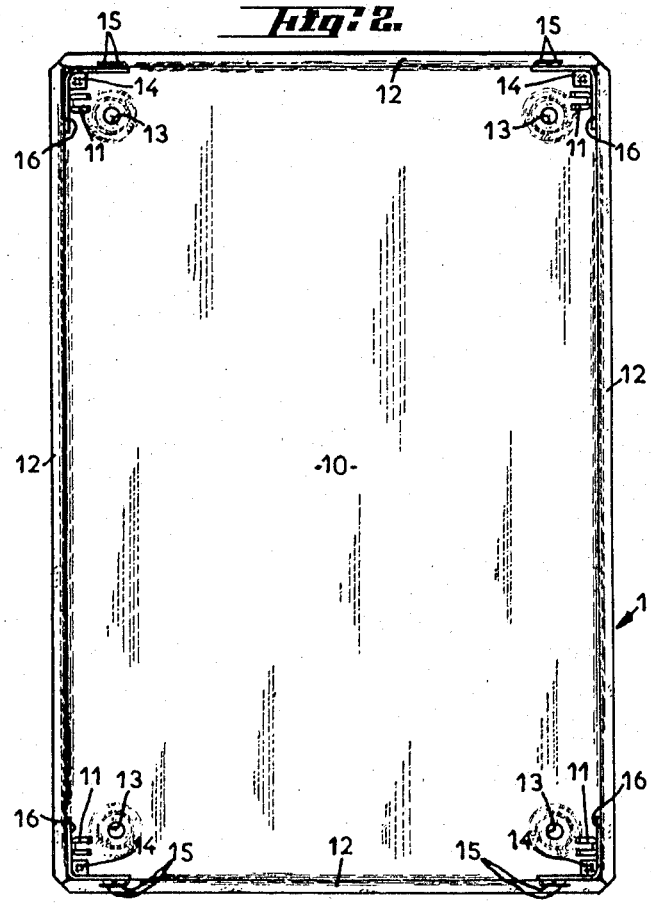
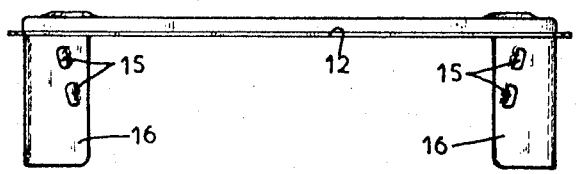
INVENTORS
WALTER PETER SCHMITT
MARCEL GEORGES KOPF
BY
Nolte & Nolte
ATTORNEYS

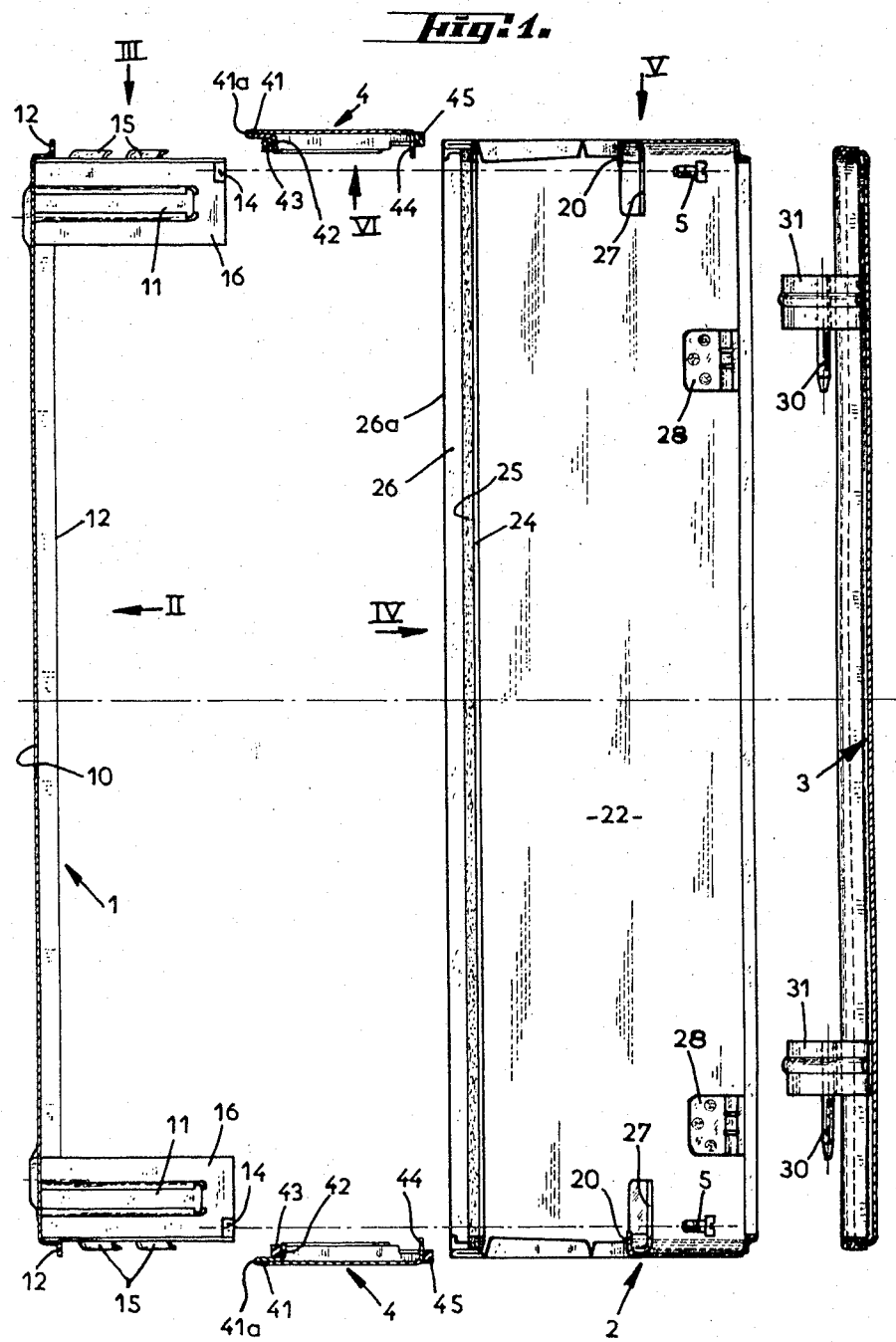

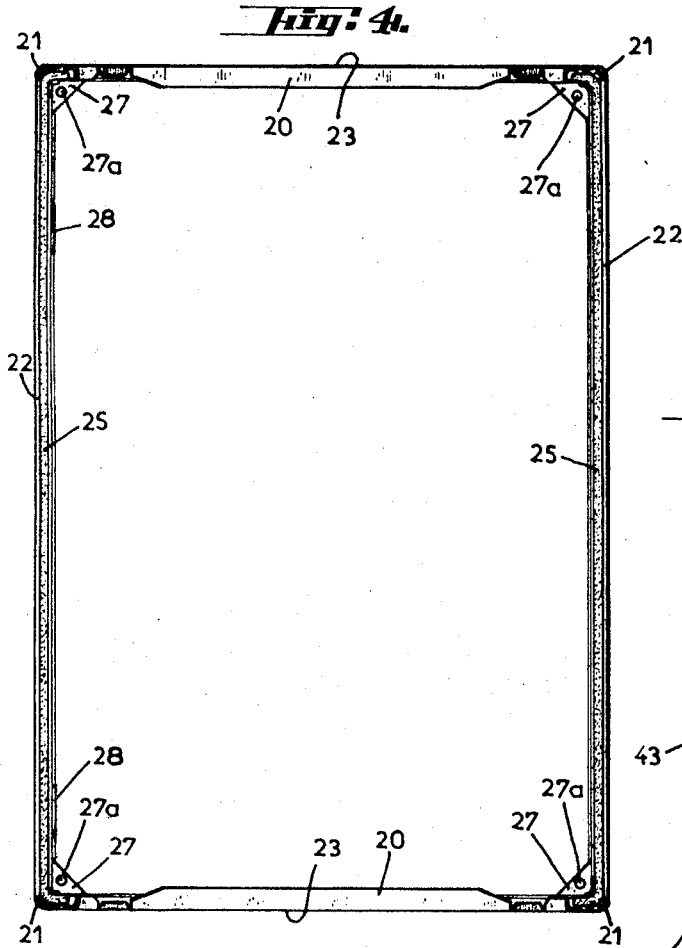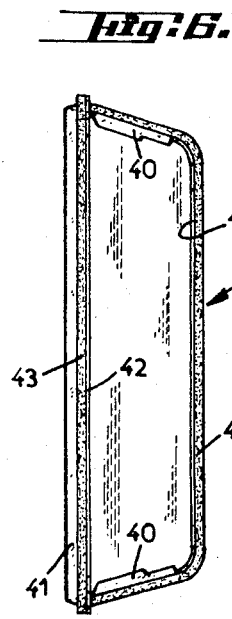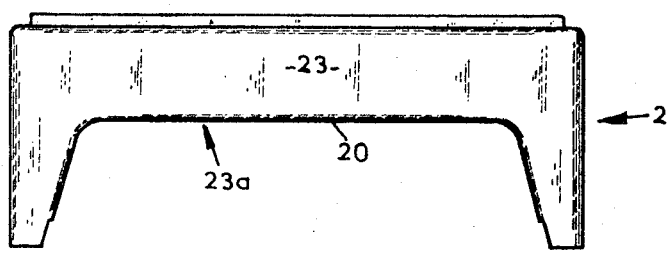

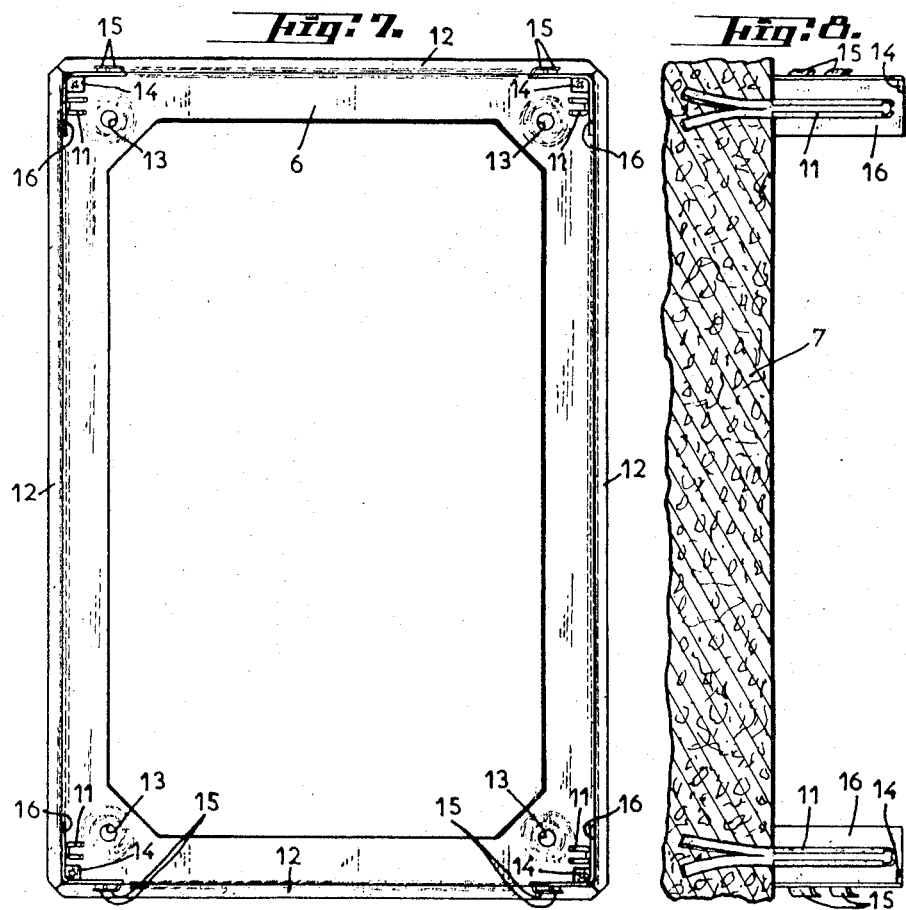

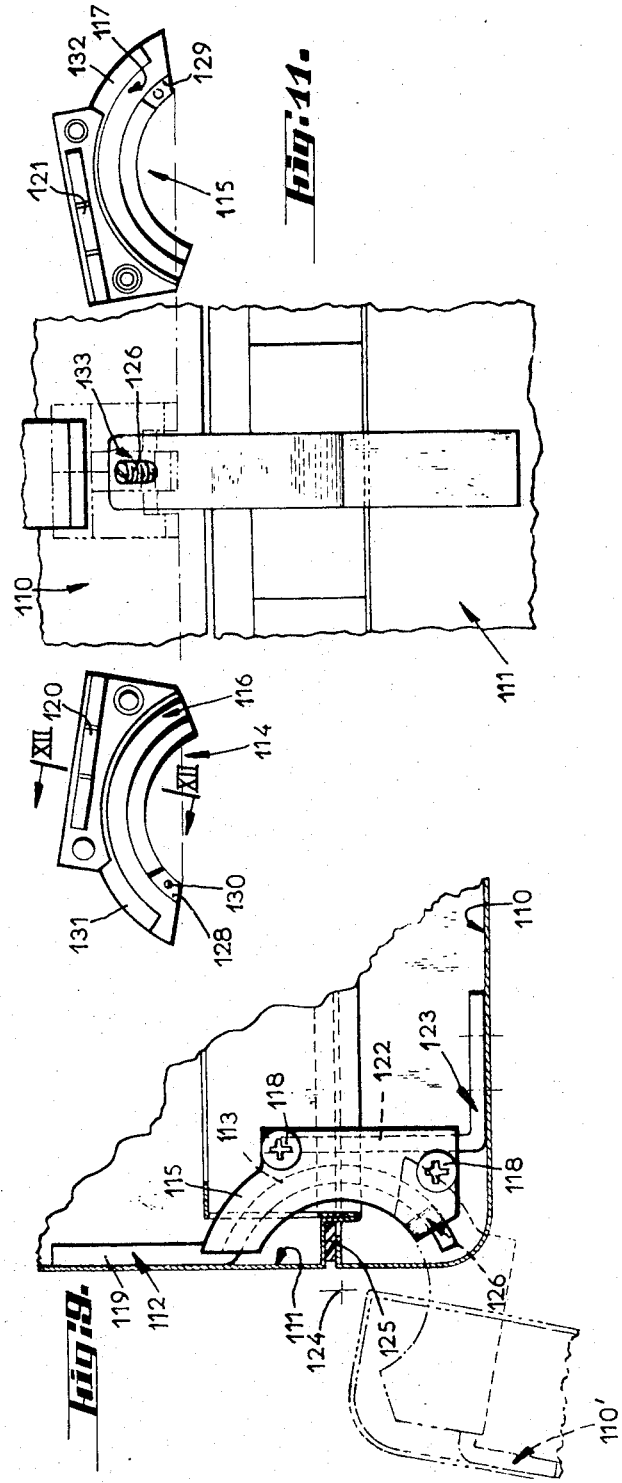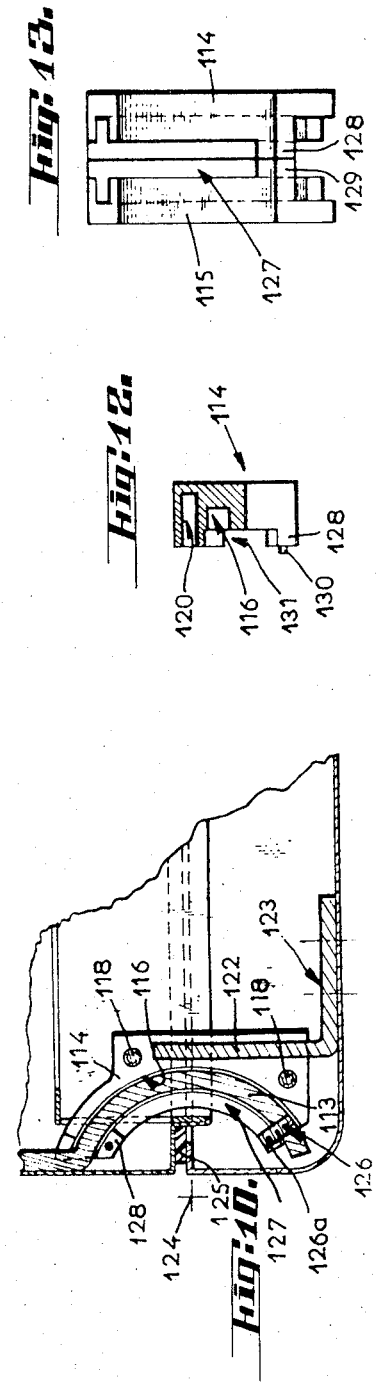

United States Patent Office 3,452,148
Patented June 24, 1969

3,452,148
ELECTRICAL CABINET WITH SEPARABLE PARTS
Walter Peter Schmitt and Marcel Georges Kopf, Sarre-Union, France, assignors to Sarel Appareillage Electrique, Sarre-Union, Bas-Rhin, France, a company of France
Filed July 27, 1967, Ser. No. 656,530
Claims priority, application France, Aug. 22, 1966, 73,728; Oct. 28, 1966, 82,061
Int. Cl. H05k 5/02; H02b 1/08
U.S. Cl. 174—52                                8 Claims

ABSTRACT OF THE DISCLOSURE

Electrical cabinet having the general configuration of a substantially rectangular or square parallelepipedon, of a type separable in several parts and propped against a bearing surface designed to support at least partly the weight of the apparatus housed within said cabinet. The cabinet comprises a supporting frame on which is secured said electric apparatus, a cover-shaped stiff body equipped with an inlet door mounted on said body by means of separable hinge joints and removable lateral side plates mounted on said frame.

---

The present invention has essentially for its object an electrical cabinet having the general configuration of a substantially rectangular or square parallelepipedon, of a type separable in several parts, and propped against a bearing surface.

Before giving a detailed explanation of the invention and of its principles, the leading known types of cabinets may be described, to give the background of the invention.

(1) A parallelepipedon-shaped cabinet including a bottom and four sides which are solid with each other, an inlet door closing the front face of the cabinet. The drawback to this type of cabinet consists in the difficulty to work inside of a parallelepipedon-shaped box when only the front face of said box is removable. The installation of the electrical apparatus into the cabinet takes a long time and is complicated. Besides, as the inlet and outlet cable-arrays of the cabinet are usually not accessible on their operating site, it is necessary to convey the whole cabinet to the workshop where these arrays are installed or repaired, this entailing very heavy handling costs.

(2) In order to overcome the drawbacks to the cabinets of the first-mentioned type, it has been proposed to produce cabinets with faces and sides which are completely separable from each other and which are assembled, for instance screwed together, at the operating site. Although the transportation costs may thus be reduced to some extent, such cabinets involve nevertheless drawbacks of importance, especially as the assembling and disassembling manipulations require much time, as the set up cabinet cannot offer a good rigidity and as neither a proper fluid-tightness nor an adequate protection from dust may be obtained. These cabinets do consequently not meet exacting servicing standards.

(3) In order to constitute a rigid cabinet and to facilitate the provision of the cable inlet and outlet borings through the cabinet sides, cabinets of a type similar to that described hereabove under (1) have been proposed elsewhere, the lateral faces of these cabinets being provided with openings which are closed by means of plates fastened with screws onto the sides, the holes necessary for the passage of the cables being bore through these plates. These cabinets present advantages, as they are rigid, fluid-tight and allow formation of the cable inlet and outlet holes without having to disassemble and to move the whole unit. Yet, the installation of the different apparatus into the cabinet is as complicated as with the cabinet of the first-mentioned type.

(4) Some types of hoods or protective sheeaths without any appreciable rigidity are also available. They are used to cover electrical apparatus which is for instance hung on a wall. But these types of mountings do not present any fluid-tightness or any dust-protection worthy of note, especially in case of a short-circuit. Their purpose is thus more aesthetic than functional.

The invention aims at overcoming the drawbacks inherent in the known devices by allowing to construct an electrical cabinet which is perfectly rigid and fluid-tight, which meets the most exacting servicing standards and which facilitates an extremely easy mounting and dismounting of the electrical apparatus. Indeed, the invention results in a handiness of use absolutely unknown up to now in this field.

A cabinet according to the invention comprises, combined together:

(1) A supporting frame fastened onto a bearing surface and including a substantially rectangular or square rigid chassis rendered solid with four corner-posts extending along a certain depth of said cabinet the aforementioned electric apparatus being secured upon this frame;

(2) A cover-shaped stiff body or hood made up by a substantially rectangular or square frame equipped with an inlet door and presenting four corners extended substantially along the whole depth of said cabinet, at least some of the adjacent corners being joined together by immovable lateral sides which close only a portion of the corresponding lateral face of the cabinet and which are provided with a cut-out opening toward the bottom of the cabinet, while the other adjacent corners are joined together by removable lateral sides closing entirely the corresponding lateral face of the cabinet, the aforesaid hood being installed and fastened upon the aforementioned supporting frame which it covers;

(3) Removable lateral side plates extending from the bottom determined by the aforementioned frame of the cabinet at least to the rearmost border of the aforesaid cut-outs provided in the immovable lateral sides which are solid with said frame, these removable side plates, when installed, closing thus the cut-away lateral sides of the cabinet;

(4) co-operating fastening means rendered respectively solid with said frame and said side plates;

(5) fastening means solid with the aforesaid frame and intended to support said apparatus;

(6) fastening means solid with the aforesaid frame and intended to secure to the latter the aforementioned hood.

It will be readily understood that the user has thus only to install or hang up the aforesaid supporting frame upon the bearing surface, for instance upon the wall which will support the cabinet. This frame being left completely free, the user may then easily fasten the electrical apparatus onto it, without being hindered in doing so by the lateral faces of the cabinet.

When this operation has been carried out, the user presents the removable lateral faces or side plates of the cabinet and marks on them the spots where the cable inlets and outlets are to pass. The necessary holes are subsequently easily bored. When all orifices are ready, the removable sides are installed and securely fastened onto the frame which is then, together with the removable sides, covered by the hood-shaped stiff body, and the inlet door is finally closed.

If, at any time, the user wants to replace an apparatus housed by the cabinet, he has only to take off the cover without disassembling the removable sides, leaving thus the input and output cables in position, in that, the cover being removed, the user has easy access to the different parts of the apparatus, and the mounting and dismounting work is very easy to perform as the side plates crossed by the cables and fastened onto the frame maintain a normal support and a proper insulation of the devices.

According to another feature of the invention, the aforesaid removable sides are forcibly fitted between corresponding ribs provided on the aforementioned chassis and other ribs bordering said cut-outs formed in the lateral faces of the cover. Besides, fluid-tight packings are preferably inserted between said ribs and said removable side plates.

In such a way, a perfectly rigid assembly, a complete fluid-tightness and an outstanding dust-protecton are obtained while still keeping the easiest possible building in of the removable cabinet sides.

According to another salient feature of the invention, the cabinet door is attached to the aforesaid frame by means of separable hinges made up by at least two cooperating members sliding within each other along a path which is curvilinear and preferably substantially in the shape of a circular arc, each of said members being respectively rendered solid with said door and with the aforementioned body making up the door frame, the first one of said members including at least one flat iron, a portion of which is curved to form a circular arc, and the second one of said members including at least one corresponding groove wherein the curved portion of said flat iron slides, the not materialized axis of each hinge being located outside from this turning joint and from this cabinet. Thus, the door hinge uses a minimum space in the cabinet, while the setting up and down of the door may be carried out very readily, this being for instance especially interesting for transportation or storage purposes. Besides, the door may be opened over an angle which may be well above 90°, making thus very easy to perform the simple inspection of the electrical apparatus housed by the cabinet.

Many other features and advantages of the invention will appear from the following detailed description, in reference to the appended drawings, given only by way of example and wherein:

FIGURE 1 shows a view, in a longitudinal (i.e. vertical for a normally installed cabinet) cross-section, of a cabinet according to the invention, the different component parts of said cabinet being presented in an exploded position;

FIGURE 2 shows the frame of the cabinet illustrated by FIGURE 1, the frame being viewed substantially as indicated by the arrow II of FIGURE 1;

FIGURE 3 shows the same frame viewed as indicated by the arrow III of FIGURE 1;

FIGURE 4 shows the cover or hood made up by the body of the cabinet, viewed substantially as indicated by the arrow IV of FIGURE 1;

FIGURE 5 shows the body of the cabinet viewed according to the direction indicated by the arrow V of FIGURE 1;

FIGURE 6 shows a removable side plate, viewed according to the direction indicated by the arrow VI of FIGURE 1;

FIGURE 7 is a view similar to that of FIGURE 2 but presenting an alternative embodiment;

FIGURE 8 shows how, in an alternative embodiment, a simplified frame may be constituted according to the invention;

FIGURE 9 shows a cross-sectional view, with a partial breaking away, of a portion of the cabinet body and door, which are hingedly assembled according to the invention: in this figure, the closed position of the door is represented by continuous lines, while the dotted lines show the open position of said door;

FIGURE 10 is a sectional view similar to that of FIGURE 9, but in a slightly shifted section-plane which passes substantially through the median plane of the hinge. Only the closed position of the door is shown here;

FIGURE 11 is a view in elevation presenting the different component elements of the hinge connecting the body of the cabinet illustrated in FIGURES 9 and 10 with the door of this cabinet: in the figure, both shell-halves constituting part of the hinge are represented with continuous lines in their exploded position, and with dotted lines in their assembled position;

FIGURE 12 is a view in a cross-section made substantially along lines XII—XII of FIGURE 11;

FIGURE 13 shows an elevation of the aforesaid two shell-halves in the assembled position and viewed from the axis of the turning joint.

According to the method of embodiment illustrated by FIGURES 1 to 6 of the drawings, the cabinet of the invention comprises essentially a metal frame 1, a cover-shaped stiff body or hood 2 closed on the front side by an inlet door 3, and removable side members 4. According to the method of embodiment represented here, the frame 1 has the shape of a cabinet bottom 10 with which four U-irons or channel irons 11 are made solid, for instance through welding, and upon which the electrical apparatus to be installed or a perforated chassis supporting this apparatus is securely fastened. The frame 1 is rigid, as its sides are especially reinforced by ribs such as 12 which will also secure a fluid-tight junction with the body or hood 2 and the removable side members 4.

In the rear wall 10 are for example provided four holes 13 giving passage to the fastening screws which allow to mount the frame 1 upon a bearing surface such as for instance a wall. Besides, at 14 may be seen the nuts used to render the body 2 solid with the frame 1 by means of the fastening screws 5.

Indicated by reference number 15 are the clamps used for the guiding and the blocking of the inwardly bent-over ribs 40 (FIGURE 6) belonging to the removable side members 4, a proper placing and building-in of these sides 4 to the frame 1 being thus made possible. It will be noted that the different component parts 11, 14 and 15 of the frame are integral with four angle-irons 16, which are welded to the rear wall 10.

The removable side members 4, which will be mounted and fastened upon the frame 1, are guided to their proper position by the slant of the ribs 40 which glide under the clamps 15 securing the blocking of the side plates 4 upon the frame 1. The flange 41 of the side member 4 covers the external bordering rib 12, the end 41a of which is, in its assembled position, substantially level with the rear wall 10 of the frame 1. When the side member 4 is installed, a rib 42 bears against the rib 12 of the frame 1, a packing 43 securing a perfect fluid-tightness as soon as this side member 4 is pushed home in position along the guiding clamps 15.

The removable side member 4 presents besides a rib 44, prolongating the rib 42 to border the rest of this side and being applied, when in its assembled position, against a corresponding rib 20 of the cover 2, a packing 45 being inserted between the two ribs.

The cover or hood 2 forming the rigid body of the cabinet has the shape of a chassis or a frame with a substantially rectangular configuration provided with four corners 21 which extend appreciably over the whole depth of the cabinet.

According to the represented method of embodiment, the adjacent corners 21 are joined by two long faces 22 and by two shorter sides 23. The lateral faces 22 close the whole width of the cabinet (FIGURE 1), while in each of the shorter sides 23 a cut-out 23a opening toward the cabinet bottom is provided. The previously mentioned bordering rib 20 runs along the rim of the cut-out 23a.

At the rear part of body 2 (on the left as illustrated by FIGURE 1), the long sides 22 are made solid with a rib 24 upon which a packing 25 is applied in order to secure a fluid-tight junction with the rib 12 of the frame 1. Beyond the rib 24, the hood body is prolongated by a portion 26 covering the rib 12 in such a way, that the rearmost edge 26a of said portion 26 lies, when the cabinet is assembled, substantially in the plane of the rear wall 10 (i.e. that it is also at level with the flange end 41a of the removable side plates 4).

It is obvious that the assembly of all these overlapping ribs which fit tightly into each other secures to the erected cabinet an outstanding rigidity.

In addition, four angle plates 27 are provided at the four corners of a hood 2 in order to allow, by means of the orifices 27a opened in these plates to receive the fastening screws 5, to secure tightly the body 2 onto the frame 1.

Indicated by 28, built-up hinges of a standard type intended to receive the pins 30 mounted on the door 3 by means of the brackets 31 (FIGURE 1) may be seen. These hinges are constituted in such way as to take the least possible space inside the cabinet and to be not apparent on the outside of this cabinet. The door 3 may be closed in a fluid-tight way upon the cover 2 as packings or any other indicated isolating means of a usual type are provided.

It will be noted that in the different figures, the shapes of the rib 20 bordering the cut-out 23a and of the rib 44 bordering the removable side plate 4 match perfectly with each other.

It will be readily understood that, in the just described method of embodiment, the assembly and the disassembly of the cabinet require only respectively the driving home and the removing of the four screws 5, all other works being automatically carried out by the simple fitting into each other of the corresponding pieces.

Yet, it is obvious that many other assembling variations may be considered. Thus, the removable side plates may be screwed together instead of being fitted into each other, although rabbeting seems to be the most practical assembly system.

According to the alternate method of embodiment illustrated by FIGURE 7, it has been supposed that the supporting frame onto which the electrical apparatus is secured does not include a real back plate closing the rear of the cabinet. The rear wall 10 (FIGURE 2) is thus replaced by an open frame 6, the rest of the component parts forming the supporting frame remaining the same. Hence, the same reference numbers are utilized to designate the parts which are similar on FIGURES 2 and 7.

In another variant, illustrated by FIGURE 8, it is shown that the supporting frame may be reduced to its more essential component parts, which are the supporting pieces and the elements necessary for the installation of the electric apparatus and of the hood. The supporting frame comprises thus only four corner posts 16, solid with the irons 11 and the nuts 14, either the posts 16 or the irons 11 being bedded into the bearing wall indicated by 7.

According to the alternate embodiment illustrated in FIGURES 9 to 13, the connection between the cabinet body and the inlet door is achieved by means of a hinge of a type especially suitable to impart a large opening angle to the door and to take but a minimum place within the cabinet.

Consequently, in this variant, the hinge connecting the body 111 of the cabinet to its inlet door 110 comprises essentially a strip or flat iron 112, a portion 113 of which is curved in the shape of a circular arc, and two shell-halves 114 and 115, each of which is provided with a guiding groove, respectively 116 and 117, wherein the curved portion 113 of flat iron 112 is engaged to slide.

According to the selected method of embodiment, the two shell-halves 114 and 115 are made solid with each other by means of screws 118 which are driven home into properly tapped orifices provided in the half-shell 114 or into built-in sleeves.

The plane portion 119 of the flat iron 112 is welded into the body 111 of the cabinet. The two shell-halves 114 and 115, which constitute the other element of the hinge solid with the door 110, are mounted upon the hood by means of housings or recesses 120, 121 which are tightly fitted upon a portion 122 of an angle iron 123 welded to the door 110.

The shell-halves 114 and 115 are advantageously moulded of a self-lubricating material, such as for example a synthetic material selected from the polyamids, especially of the materials commercially referred to as "nylon" or "rilsan."

The angular movements of both hinge elements with respect to each other appear clearly from FIGURE 9. In this figure, it may be noted that the axis 124 of the hinge is located outside from this hinge and also outside from the body 111 and the door 110 of the cabinet.

This shifting of the rotatory axis of the hinge allows to open the door 110 over an angle which is above 90°, and is for instnace of about 100°, to limit the cumbersomeness of the hinge within the cabinet and to obtain a perfectly fluid-tight junction line between the closed door and the body 111 forming the door frame, while still avoiding injury to or tearing off, particularly during the opening of said door 110, the packing 125 inserted between said body and said door.

In order to limit the angular opening motion of the door and to allow at the same time easy total dismounting of said door, special means are used in the illustrated method of embodiment, said means including a grub-screw or slug 126 which may be driven home into a tapped boring provided in the flat iron in the vicinity of the free end of the curved portion 113 belonging to said flat iron 112.

When the grub-screw 126 is driven home in the strip portion 113, as it appears clearly in FIGURE 10, the end 126a of the screw 126 projects beyond the strip toward the hinge axis 124 and is housed within a space 127 which is left free between the shell-halves 114 and 115, as especially visible on FIGURES 10 and 13.

One end of the free space 127 is closed by a tongue made of two portions 128 and 129 which are integral with the two shell-halves 114 and 115 (FIGURES 11 and 13). A pin or gudgeon 130 may besides connect the two noses 128 and 129 composing said tongue. When the door 110 is completely opened, the tongue composed by the two noses 128 and 129 rotates by sliding along the curved portion 113 of the flat iron and, in its outmost position, said tongue abuts against the end portion 126a of the grub-screw 126 projecting into the space 127. The door 110 reaches then its end-of-travel opening position.

To remove the door by disassembling the hinge, it is sufficient to unscrew the slug 126, this being easy to perform (FIGURE 11) through the axis hole provided on the rear of shell-halves 114 and 115, which have been swept out in 131 and 132 so as to constitute a passage 133 through which said screw 126 may be removed.

Although the hinge element co-operating with the flat iron 12 is constituted by two assembled shell-halves in the just described preferred method of embodiment, said element may also be realized as a single piece, for instance moulded.

It should be understood that the invention is by no ways limited to the methods of embodiment described and represented, which have been given only by way of examples.

What we claim is:

1. An electrical cabinet having the general configuration of a substantially rectangular or square parallelepipedon, of a type separable in several parts and propped against a bearing surface designed to support at least partly the weight of the apparatus housed within said cabinet comprising:

a supporting frame fastened onto said bearing surface and including a substantially rectangular or square rigid chassis rendered solid with four corner-posts extending along a certain depth of said cabinet, the aforementioned electric apparatus being secured upon this supporting frame;

a cover-shaped stiff body or hood made up by a substantially rectangular or square frame equipped with an inlet door attached to said square frame by means of separable hinges, and presenting four corners extended substantially along the whole depth of said cabinet, at least some of the adjacent corners being joined together by immovable lateral sides which close only a portion of the corresponding lateral face of the cabinet and which are provided with a cut-out opening toward the bottom of the cabinet while the other adjacent corners are joined together by removable lateral sides closing entirely the corresponding lateral face of the cabinet, the aforesaid hood being installed and fastened upon the aforementioned supporting frame which it covers;

removable lateral side plates, extending from the bottom determined by the aforementioned supporting frame of the cabinet at least to the rearmost border of the aforesaid cut-outs provided in the immovable lateral sides which are solid with said frame, these removable side plates, when installed, closing thus the cut-away lateral sides of the cabinet;

fastening means provided on said supporting frame, and designed to co-operate with corresponding means equipping the aforementioned side plates in order to secure a proper junction between said supporting frame and said side plates;

fastening means solid with the aforesaid supporting frame and intended to support said apparatus;

fastening means solid with the aforesaid supporting frame and intended to secure to the latter the aforementioned hood.

2. Electrical cabinet according to claim 1, characterized in that a plate forming the rear wall of the cabinet is rendered solid with the aforesaid chassis.

3. Electrical cabinet according to claim 1, characterized in that the aforementioned supporting frame is constituted by corner-posts fastened unto said bearing surface.

4. Electrical cabinet according to claim 1, characterized in that the aforesaid removable side plates are provided with reinforcing ribs which are forcibly fitted between corresponding ribs provided on the aforementioned chassis and other ribs bordering said cut-outs.

5. Electrical cabinet according to claim 4, characterized in that fluid-tight packings are inserted between the corresponding co-operating ribs.

6. Electrical cabinet according to claim 1, characterized in that said separable hinges are made up by at least two co-operating members sliding within each other along a path which is curvilinear and preferably substantially in the shape of a circular arc, each of said members being respectively rendered solid with said door and with the aforementioned body making up the door-frame, the first one of said members including at least one flat iron, portion of which is curved to form a circular arc and the second one of said members including at least one corresponding groove wherein the curved portion of said flat iron slides, the not materialized axis of each hinge being located externally of the hinge and, of the cabinet.

7. Electrical cabinet according to claim 6, characterized in that the second one of said members comprises two shell halves screwed together and made of a self-lubricating material said shell-halves being provided with gorges facing each other and forming the aforementioned groove wherein said flat-iron portion slides as well as with complementary housings or recesses designed to secure their mounting upon said door or said door-frame.

8. Electrical cabinet according to claim 7, characterized in that the aforementioned shell-halves, when assembled facing each other, determine between them a free space forming a slot which runs along and communicates with the aforesaid groove wherein said flat iron portion slides, one end of said free space being closed by a tongue constituted by noses provided on said shell-halves, these noses facing and contacting each other, a grub-screw introduced into a tapped hole of said flat iron moving within said slot following the opening and closing motions of the aforementioned door while, in the end position corresponding to the maximum opening of the latter, the end portion of said grub-screw, projecting from the flat iron, abuts against the aforementioned tongue, the aforementioned shell-halves being also provided, at their junction line with notches in order to constitute a way giving access to said grub-screw in a relative opening position of said door.

References Cited

UNITED STATES PATENTS 1,620,047   3/1927   Van Valkenburg.

LEWIS H. MYERS, *Primary Examiner.*

D. A. TONE, *Assistant Examiner.*

U.S. Cl. X.R.

317—120